(12) United States Patent
Lee (10) Patent No.: US 11,936,245 B2
(45) Date of Patent: Mar. 19, 2024

(54) MOTOR

(71) Applicant: LG INNOTEK CO., LTD., Seoul (KR)

(72) Inventor: Jung Kyu Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 444 days.

(21) Appl. No.: 17/273,103

(22) PCT Filed: Sep. 9, 2019

(86) PCT No.: PCT/KR2019/011645
§ 371 (c)(1),
(2) Date: Mar. 3, 2021

(87) PCT Pub. No.: WO2020/060093
PCT Pub. Date: Mar. 26, 2020

(65) Prior Publication Data
US 2021/0344239 A1  Nov. 4, 2021

(30) Foreign Application Priority Data

Sep. 18, 2018  (KR) .......................... 10-2018-0111769

(51) Int. Cl.
*H02K 1/27* (2022.01)
*H02K 1/278* (2022.01)
(Continued)

(52) U.S. Cl.
CPC ............. *H02K 1/278* (2013.01); *H02K 21/16* (2013.01); *H02K 2201/06* (2013.01); *H02K 2213/03* (2013.01)

(58) Field of Classification Search
CPC .... H02K 1/278; H02K 21/16; H02K 2201/06; H02K 2213/03; H02K 2201/09; H02K 7/04; H02K 1/22
See application file for complete search history.

(56) References Cited

U.S. PATENT DOCUMENTS 9,634,530 B2 * 4/2017 Klein ..................... H02K 29/03
2015/0108867 A1 4/2015 Nakagawa et al.
(Continued)

FOREIGN PATENT DOCUMENTS

CN  103779993  5/2014
JP  2003-032927  1/2003
(Continued)

OTHER PUBLICATIONS

International Search Report dated Dec. 13, 2019 issued in Application No. PCT/KR2019/011645.
(Continued)

*Primary Examiner* — Thomas Truong
(74) *Attorney, Agent, or Firm* — KED & ASSOCIATES, LLP (57) ABSTRACT

An embodiment relates to a motor comprising: a shaft; a rotor connected to the shaft; and a stator disposed outside the rotor, wherein the rotor includes N rotor cores, and the number of holes formed through each of the N rotor cores is at least 2N. Accordingly, the motor allows the rotor to have a skew angle by using the multiple holes formed through the rotor cores.

19 Claims, 10 Drawing Sheets

(51) Int. Cl.
    *H02K 1/28*    (2006.01)
    *H02K 21/16*   (2006.01)

(56) References Cited

U.S. PATENT DOCUMENTS

2016/0294251 A1\* 10/2016 Fukasaku ................. F04C 23/02
2018/0097413 A1\*  4/2018 Sun ......................... H02K 1/28

FOREIGN PATENT DOCUMENTS

| JP | 2009-225519    | 10/2009 |
| JP | 2010-233291    | 10/2010 |
| JP | 2018-088748    |  6/2018 |
| KR | 10-2015-0051566 |  5/2015 |
| KR | 10-2017-0110470 | 10/2017 |

OTHER PUBLICATIONS

European Search Report dated May 12, 2022 issued in Application No. 19863436.2.
Korean Office Action dated Sep. 13, 2023 issued in Application No. 10-2018-0111769.

\* cited by examiner

MOTOR

CROSS-REFERENCE TO RELATED PATENT APPLICATIONS

This application is a U.S. National Stage Application under 35 U.S.C. § 371 of PCT Application No. PCT/KR2019/011645, filed Sep. 9, 2019, which claims priority to Korean Patent Application No. 10-2018-0111769, filed Sep. 18, 2018, whose entire disclosures are hereby incorporated by reference.

TECHNICAL FIELD

The present invention relates to a motor.

BACKGROUND ART

Motors are apparatuses configured to convert electrical energy to mechanical energy to obtain rotational forces and are widely used for vehicles, home appliances, industrial machines, and the like.

A motor may include a housing, a shaft, a stator disposed in the housing, a rotor installed on an outer circumferential surface of the shaft, and the like. In this case, an electrical interaction is induced between the stator and the rotor so that the rotor rotates. In addition, the shaft also rotates according to the rotation of the rotor.

Particularly, the motor may be used in an apparatus for securing steering stability of a vehicle. For example, the motor may be used as a motor in an electronic power steering (EPS) system or the like for a vehicle.

The rotor may be formed by stacking a plurality of unit rotors.

In this case, the rotor is formed so that a skew angle is applied between unit rotors to improve a cogging torque.

However, when the shaft is press-fitted to the rotor, a problem occurs in that the skew angle is distorted. Accordingly, a cogging torque of the motor is increased and thus there is a problem in that quality of the motor is degraded.

Technical Problem

The present invention is directed to providing a motor in which a skew angle is formed in a rotor using a plurality of holes formed in unit rotor cores.

In addition, the present invention is directed to providing a motor in which a skew angle formed in a rotor is prevented from being distorted by using a pin disposed in a hole.

Objectives to be solved by the present invention are not limited to the above-described objectives, and other objectives which are not described above will be clearly understood by those skilled in the art from the following specification.

Technical Solution

One aspect of the present invention provides a motor including a shaft, a rotor coupled to the shaft, and a stator disposed outside the rotor, wherein the rotor includes N rotor cores, and the number of holes, each of which is formed in one of the N rotor cores, is at least 2N.

The 2N holes may include a first group having N holes for arranging the rotor cores and a second group having N holes for balancing rotation of the rotor cores, and first angles ($\theta 1$) formed between the N holes of the first group may be the same.

A second angle ($\theta 2$) formed by a first hole of the first group and the hole, which is closest to the first hole, of the second group may be different from the first angle ($\theta 1$) of the first group. In this case, the first hole of the first group may be a reference hole for arranging the rotor cores.

The hole of the first group and the hole of the second group may be symmetrically disposed based on a center of the rotor core.

Each of the N rotor cores may include a plurality of guide protrusions formed on an outer circumferential surface of the rotor core, and the guide protrusions of the N rotor cores may not overlap in a vertical direction.

Each of the N rotor cores may include a first rotor core and a second rotor core, each of which includes a plurality of guide protrusions, the first angle may be greater than a third angle ($\theta 3$) formed by two guide protrusions, which are disposed adjacent to each other, of the plurality of guide protrusions formed on the first rotor core.

The first angle ($\theta 1$) may be the sum of the third angle ($\theta 3$) and an angle ($\theta 4$) formed by one of the guide protrusions of the first rotor core and the guide protrusion, which is closest to the one of the guide protrusions, of the second rotor core.

Another aspect of the present invention provides a motor including a shaft, a rotor coupled to the shaft, and a stator disposed outside the rotor, wherein the rotor includes a first rotor core, a second rotor core, and a third rotor core, each of which includes M holes spaced apart from each other, the M holes include a first hole which is a reference hole, a second hole adjacent to the first hole, and a third hole adjacent to the second hole, and the first hole of the first rotor core is disposed to overlap the second hole of the second rotor core and the third hole of the third rotor core in a vertical direction.

The rotor may further include a pin disposed to pass through the first hole of the first rotor core, the second hole of the second rotor core, and the third hole of the third rotor core which are disposed to overlap in the vertical direction.

Still another aspect of the present invention provides a motor including a shaft, a rotor coupled to the shaft, and a stator disposed outside the rotor, wherein the rotor includes a first rotor core and a second rotor core, each of which includes a plurality of holes spaced apart from each other and guide protrusions, and two holes, which are adjacent to each other, of the holes of the first rotor core form a first angle ($\theta 1$) which is the same as a sum of an angle ($\theta 3$) formed by two guide protrusions, which are adjacent to each other, of the guide protrusions of the first rotor core and an angle ($\theta 4$) formed by the guide protrusion of the first rotor core and the guide protrusion, which is closest to the guide protrusion of the first rotor core in a circumferential direction, of the second rotor core around a center of the first rotor core.

Yet another aspect of the present invention provides a motor including a shaft, a rotor coupled to the shaft, and a stator disposed outside the rotor, wherein the rotor includes a plurality of rotor cores and a plurality of magnets disposed on an outer circumferential surface of each of the rotor cores, each of the rotor cores includes first holes, second holes, and third holes, two of the first holes, two of the second holes, and two of the third holes are disposed mutually opposite to each other based on a center (C) of the shaft, a first angle ($\theta 1$) formed by one of the first holes and the second hole is the same as an angle formed by the second hole and the third hole around the center (C), the plurality of rotor cores include a first rotor core, a third rotor core, and a second rotor core disposed between the first rotor core and the third rotor core, and the first hole of the first rotor core, the second hole of the second rotor core, and the third hole of the third rotor core overlap in a shaft direction.

When the number of the magnets is six, a second angle ($\theta 2$) formed by the one of the first holes and the third hole which is disposed adjacent to the one of the first holes around the center (C) may be smaller than the first angle ($\theta 1$).

The first angle ($\theta 1$) may be 66.67°.

When the number of the magnets is eight, a second angle ($\theta 2$) formed by the one of the first holes and the third hole which is disposed adjacent to the one of the first holes around the center (C) may be greater than the first angle ($\theta 1$).

The first angle $\theta 1$ may be 50°.

The sum of an angle formed by the first hole and the second hole, an angle formed by the second hole and the third hole, and the second angle $\theta 2$ may be 180°.

The first hole and the second hole may be symmetrically disposed based on a virtual line (L1) connecting a center of the third hole and a center (C) of the rotor core.

The rotor may further include a pin disposed to pass through the first hole of the first rotor core, the second hole of the second rotor core, and the third hole of the third rotor core which are disposed to overlap in a vertical direction.

The pin may be provided as two pins.

Advantageous Effects

In a motor according to embodiments, a skew angle can be formed in a rotor using a plurality of holes formed in rotor cores. In this case, the hole can be provided as a reference hole when the plurality of rotor cores are disposed in a shaft direction to form the skew angle.

In addition, a pin disposed in the hole can prevent the skew angle formed in the rotor from being distorted and can guide coupling of the rotor cores to form the skew angle.

Various useful advantages and effects of the embodiments are not limited to the above-described contents and will be more easily understood from descriptions of the specific embodiments.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

Hereinafter, example embodiments of the invention will be described in detail with reference to the accompanying drawings. Components that are the same or correspond to each other will be denoted by the same reference numerals regardless of the figure numbers, and redundant descriptions will be omitted.

Figure 1:
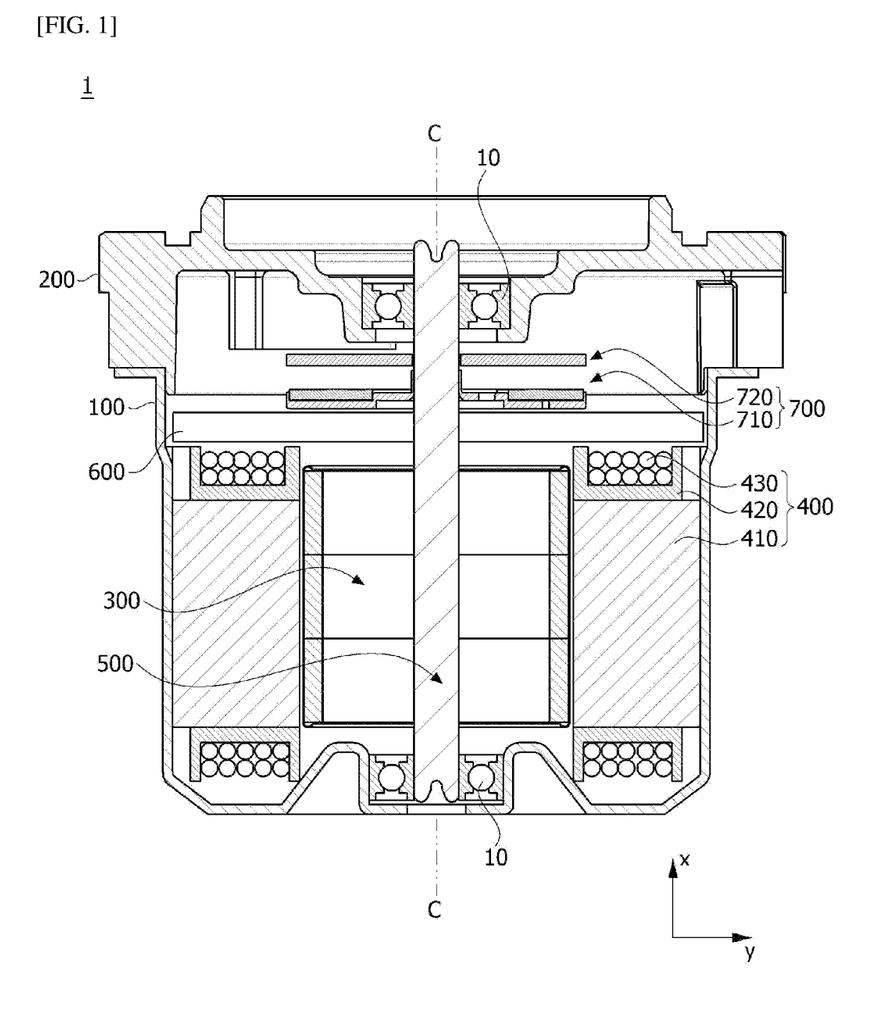
FIG. 1 is a view illustrating a motor according to an embodiment.

FIG. 1 is a view illustrating a motor according to an embodiment. In FIG. 1, an x direction may be referred to as a shaft direction, and a y direction may be referred to as a radial direction. In addition, the shaft direction may be perpendicular to the radial direction. In this case, the shaft direction may denote a longitudinal direction of the shaft 500.

Referring to FIG. 1, a motor 1 according to the embodiment may include a housing 100 in which an opening is formed at one side thereof, a cover 200 disposed on the housing 100, a rotor 300 coupled to a shaft 500, a stator 400 disposed in the housing 100, the shaft 500 configured to rotate with the rotor 300, a busbar 600 disposed above the stator 400, and a sensor part 700 configured to detect rotation of the rotor 300. In this case, the rotor 300 may be formed by stacking a plurality of unit rotors 300A in the shaft direction. In this case, each of the unit rotors 300A may include a rotor core 310, in which a plurality of holes are formed, and magnets 320 disposed on the rotor core 310. In this case, the unit rotor 300A may be referred to as a puck.

Accordingly, the motor 1 may be manufactured as a skew type motor in which the plurality of rotor cores 310 are disposed to be distorted at a predetermined angle using a plurality of holes in the rotor 300 when the unit rotors 300A are stacked. In this case, in the motor 1, a pin 330 coupled to one of the holes may be used to guide an arrangement of the rotor cores 310 to form a preset skew angle and prevent distortion of the rotor cores 310 due to press-fitting of the shaft 500 at the same time.

The motor 1 may be a motor used in an electronic power steering (EPS) system. The EPS system may assist a steering force using a driving force of the motor to secure turning stability and provide a rapid restoring force. Accordingly, a driver of the vehicle can travel safely.

The housing 100 and the cover 200 may form an exterior of the motor 1. In addition, the housing 100 may be coupled to the cover 200 to form an accommodation space. Accordingly, as illustrated in FIG. 1, the rotor 300, the stator 400, the shaft 500, the busbar 600, the sensor part 700, and the like may be disposed in the accommodation space. In this case, the shaft 500 is rotatably disposed in the accommodation space. Accordingly, the motor 1 may further include bearings 10 disposed on an upper portion and a lower portion of the shaft 500.

The housing 100 may be formed in a cylindrical shape. In addition, the rotor 300, the stator 400, and the like may be accommodated in the housing 100. In this case, the shape or a material of the housing 100 may be variously changed. For example, the housing 100 may be formed of a metal material which firmly withstands even high temperatures.

The cover 200 may be disposed on an open surface of the housing 100, that is, an upper portion of the housing 100, to cover an opening of the housing 100.

Figure 2:
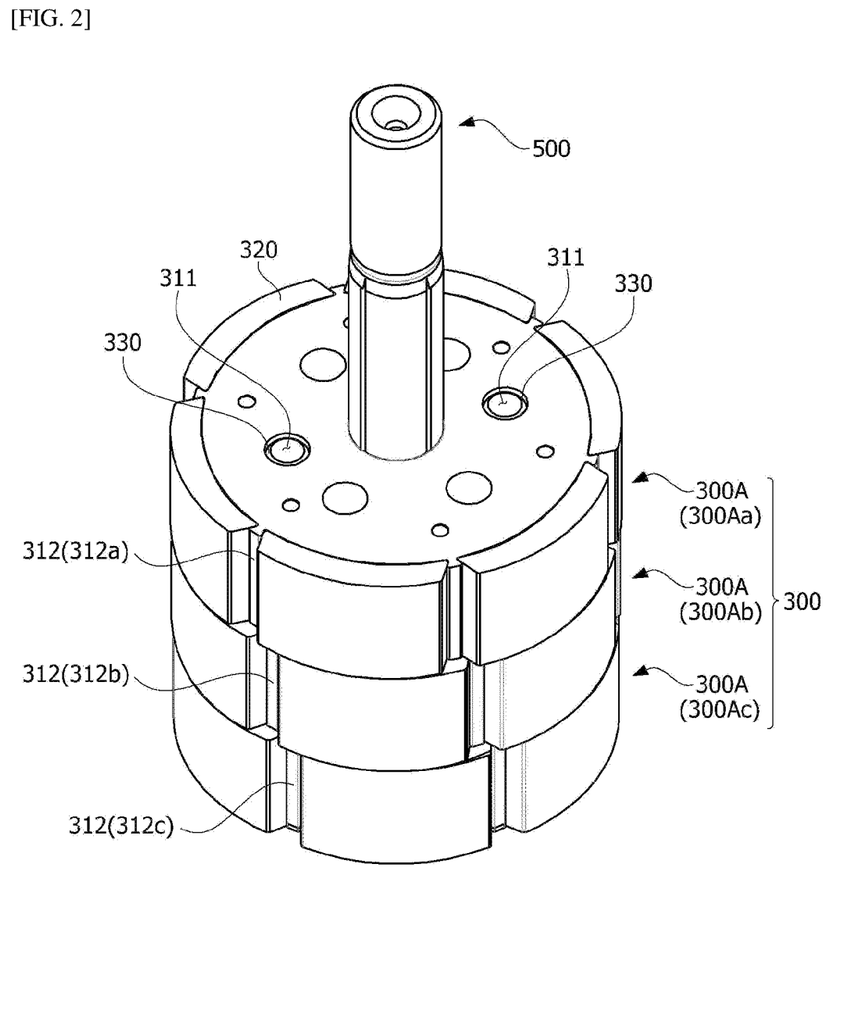
FIG. 2 is a perspective view illustrating coupling of a rotor and a shaft of the motor according to the embodiment.
Figure 3:
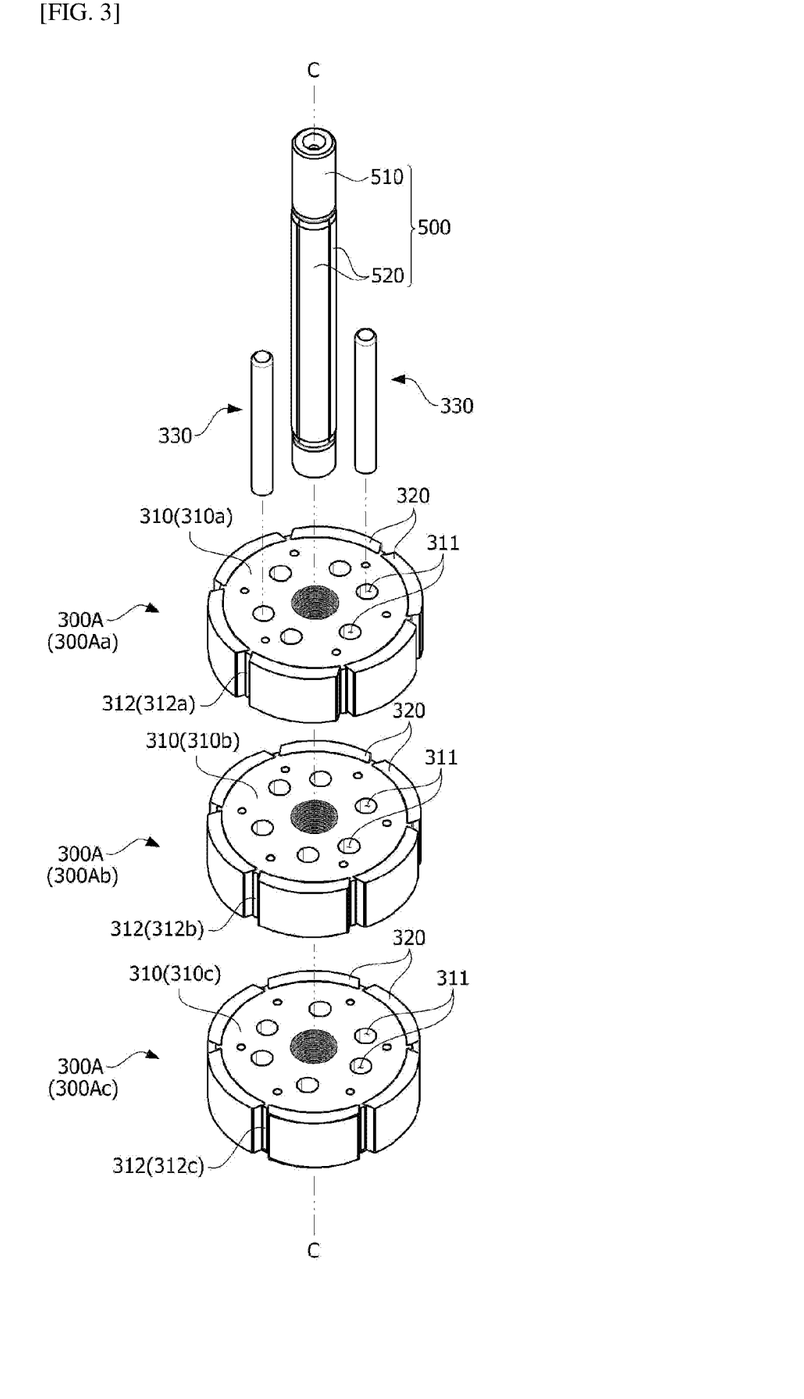
FIG. 3 is an exploded perspective view illustrating the coupling of the rotor and the shaft of the motor according to the embodiment.

FIG. 2 is a perspective view illustrating coupling of the rotor and the shaft of the motor according to the embodiment, and FIG. 3 is an exploded perspective view illustrating the coupling of the rotor and the shaft of the motor according to the embodiment.

Referring to FIGS. 2 and 3, the rotor 300 may be formed by stacking the plurality of unit rotors 300A. In this case, in the rotor 300, the pin 330 may be used to guide stacking of the unit rotors 300A. For example, in a state in which the plurality of unit rotors 300A are fitted onto the pin 330 to be stacked, the shaft 500 is press-fitted to the unit rotors 300A to form a rotor assembly in which the rotor 300 and the shaft 500 are coupled. Accordingly, when the shaft 500 is press-fitted thereto, the pin 330 may prevent the rotor cores 310 from being distorted due to the press-fitting.

Figure 4:
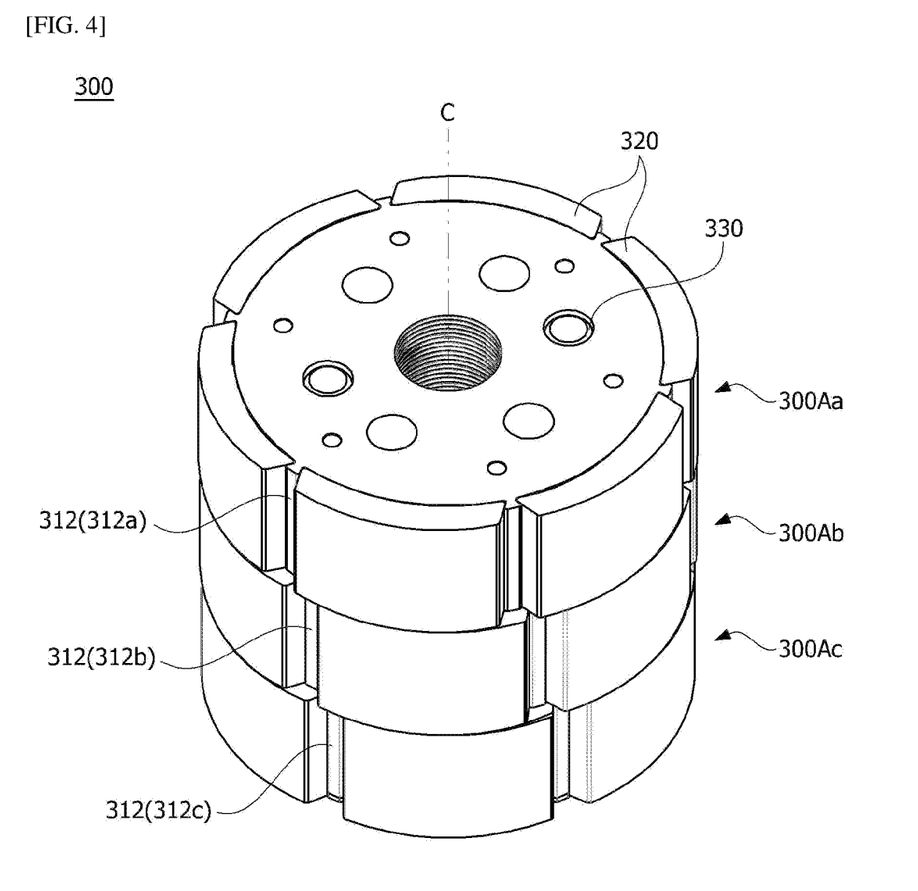
FIG. 4 is a perspective view illustrating the rotor disposed in the motor according to the embodiment.
Figure 5:
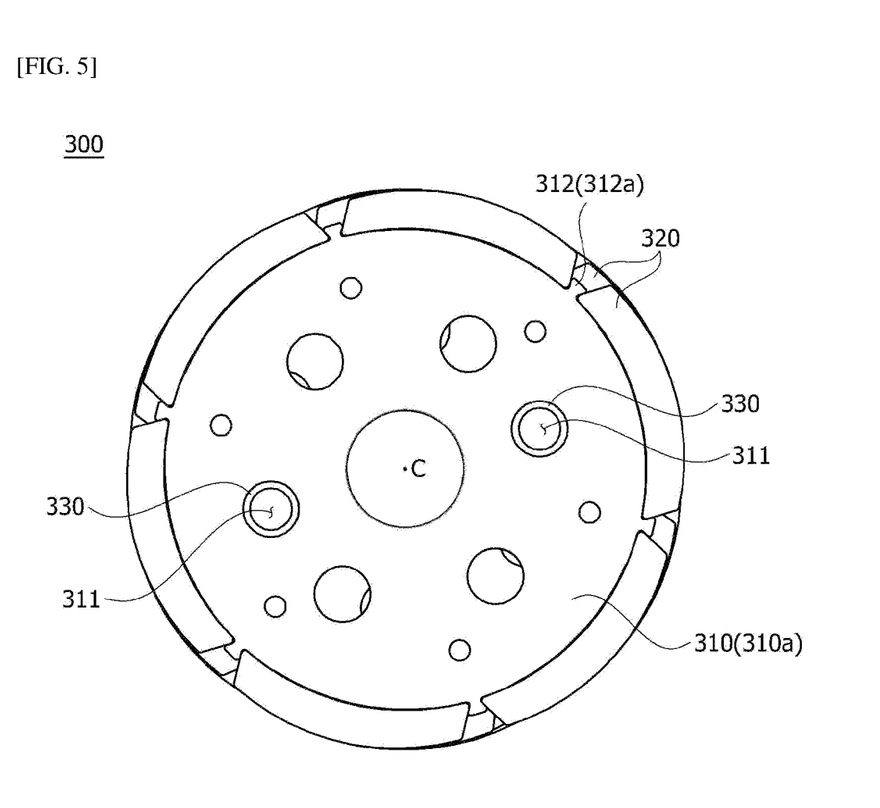
FIG. 5 is a plan view illustrating the rotor disposed in the motor according to the embodiment.
Figure 6:
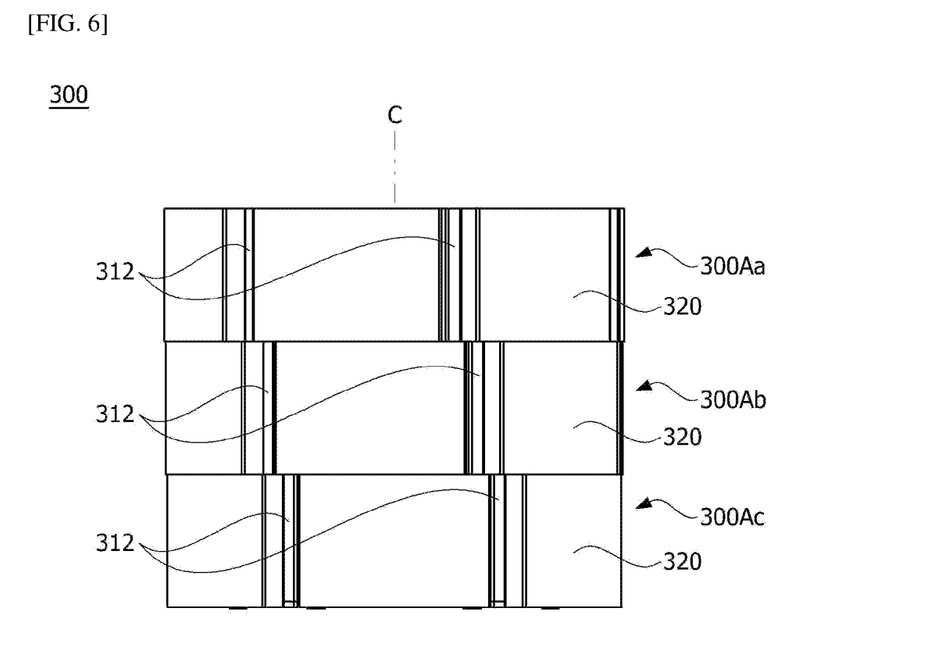
FIG. 6 is a side view illustrating the rotor disposed in the motor according to the embodiment.

FIG. 4 is a perspective view illustrating the rotor disposed in the motor according to the embodiment, FIG. 5 is a plan view illustrating the rotor disposed in the motor according to the embodiment, and FIG. 6 is a side view illustrating the rotor disposed in the motor according to the embodiment.

Referring to FIGS. 4 to 6, the rotor 300 may include the plurality of rotor cores 310, the plurality of magnets 320 disposed on an outer circumferential surface of each of the rotor cores 310, and the pin 330 coupled to the rotor core 310 to guide the arrangement of the rotor cores 310. In this case, a plurality of holes 311 may be formed in each of the rotor cores 310. In addition, the pin 330 may be disposed in one of the holes 311 to guide the arrangement of the rotor cores 310 so that the magnets 320 are installed to form the preset skew angle.

In this case, since the rotor 300 is formed by stacking the plurality of unit rotors 300A, the plurality of rotor cores 310 may be disposed in the shaft direction.

In addition, in the rotor 300, the plurality of unit rotors 300A may be disposed to be distorted by a predetermined angle to form the skew angle between the unit rotors 300A.

Figure 7:
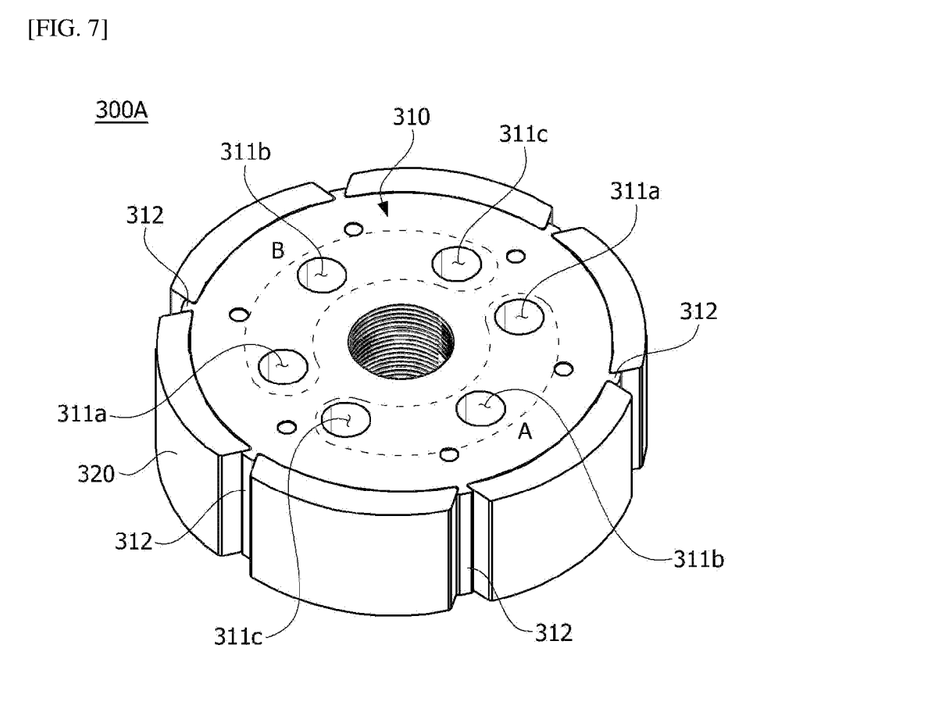
FIG. 7 is a perspective view illustrating a unit rotor of the rotor disposed in the motor according to the embodiment.
Figure 8:
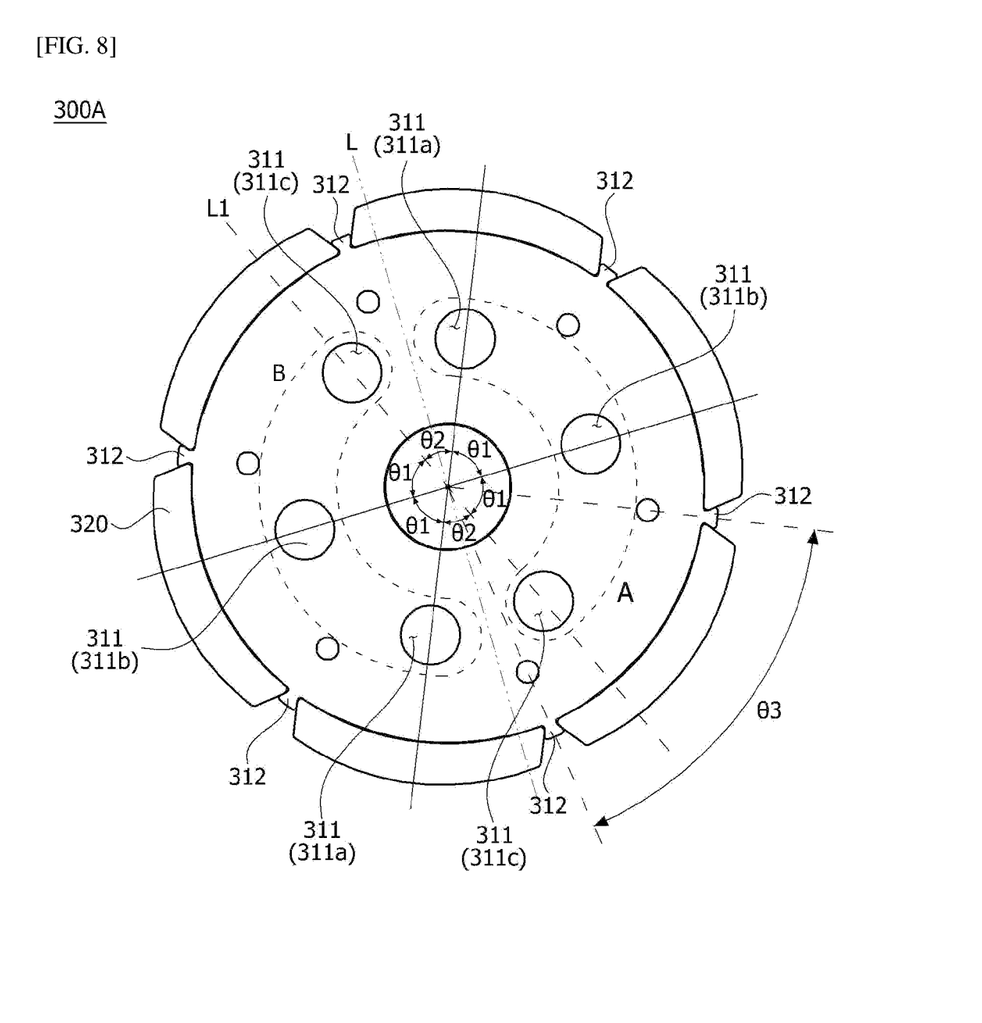
FIG. 8 is a plan view illustrating the unit rotor of the rotor disposed in the motor according to the embodiment.
Figure 9:
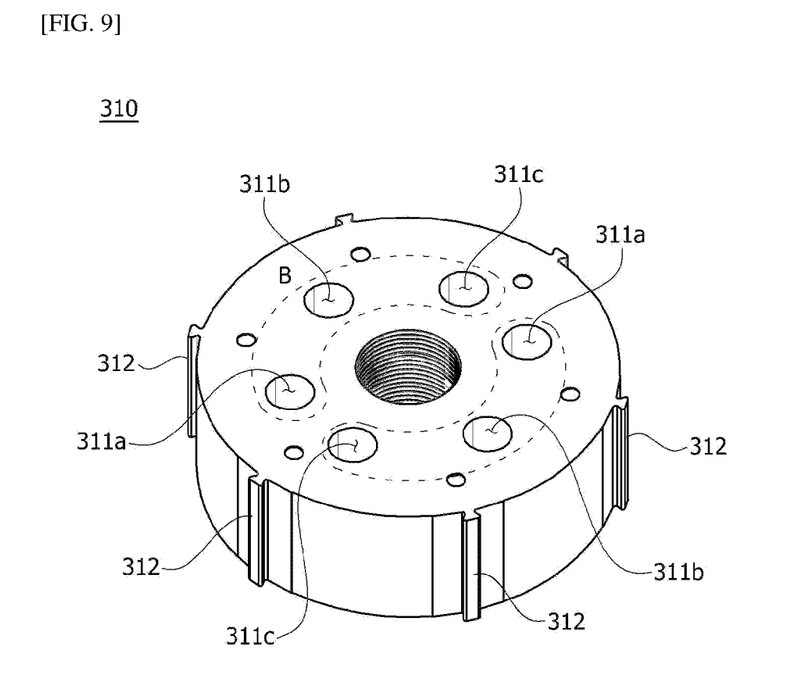
FIG. 9 is a perspective view illustrating a rotor core of the unit rotor disposed in the motor according to the embodiment.
Figure 10:
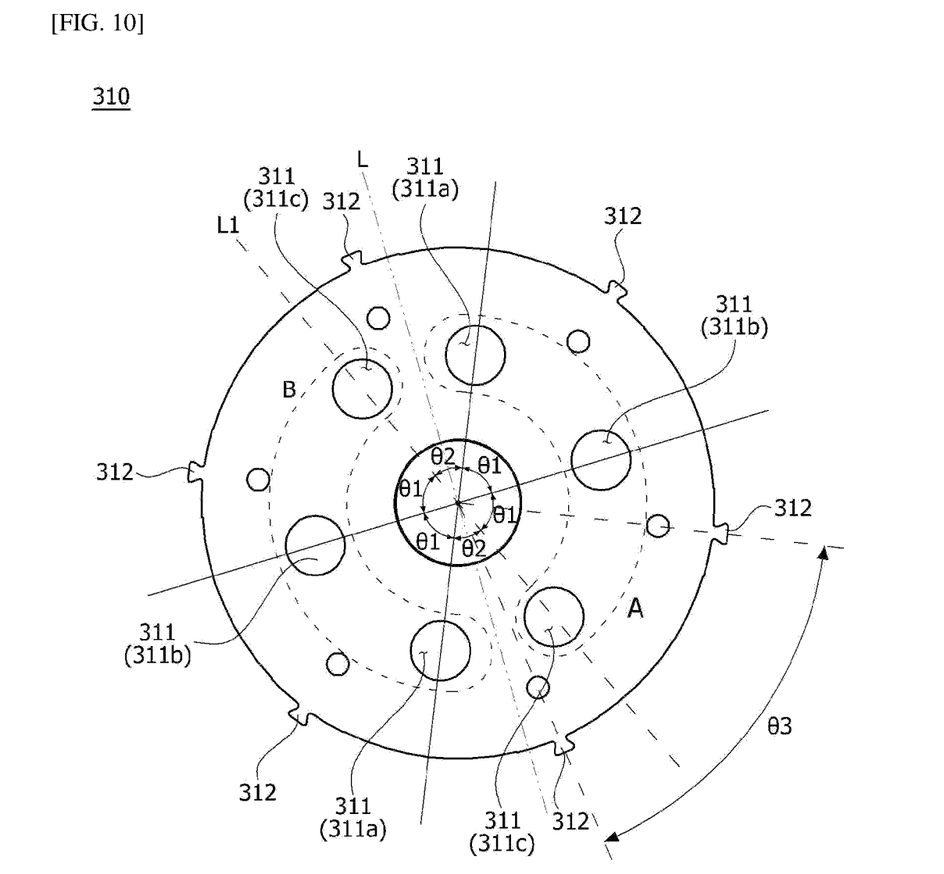
FIG. 10 is a plan view illustrating the rotor core of the unit rotor disposed in the motor according to the embodiment.

FIG. 7 is a perspective view illustrating the unit rotor of the rotor disposed in the motor according to the embodiment, FIG. 8 is a plan view illustrating the unit rotor of the rotor disposed in the motor according to the embodiment, FIG. 9 is a perspective view illustrating the rotor core of the unit rotor disposed in the motor according to the embodiment, and FIG. 10 is a plan view illustrating the rotor core of the unit rotor disposed in the motor according to the embodiment.

Referring to FIGS. 7 and 8, the unit rotor 300A may include the rotor core 310, in which the plurality of holes 311 are formed, and the plurality of magnets 320 disposed on the outer circumferential surface of the rotor core 310. For example, the plurality of magnets 320 may be disposed on the outer circumferential surface of the rotor core 310 to be spaced apart from each other at preset intervals in a circumferential direction.

In this case, the rotor core 310 may include a plurality of guide protrusions 312 formed to guide an arrangement of the magnets 320. In this case, the guide protrusions 312 may be formed to protrude from the outer circumferential surface of the rotor core 310 in the radial direction. Accordingly, a side surface of the magnet 320 may be in contact with the guide protrusion 312.

In this case, the magnets 320 may be referred to as rotor magnets or drive magnets. In addition, the rotor core 310 may be formed in a form in which a plurality of circular thin steel plates are stacked or a single cylindrical form. In addition, a hole coupled to the shaft 500 may be formed at a center C of the rotor core 310.

As illustrated in FIGS. 9 and 10, the guide protrusions 312 may be formed to be spaced apart from each other in the circumferential direction. Accordingly, the magnets 320 may be disposed between the guide protrusions 312. In this case, the number of the guide protrusions 312 is the same as the number of the magnets 320.

In addition, the guide protrusions 312 of the unit rotors 300A are disposed to not overlap in the shaft direction. Accordingly, the skew angle may be formed between the plurality of magnets 320 disposed in a vertical direction (shaft direction) in the rotor 300. However, one regions of the guide protrusions 312 may overlap in the shaft direction, but even in this case, centers of the guide protrusions 312 do not overlap in the shaft direction when viewed from above.

Meanwhile, the rotor 300 may be formed by stacking the plurality of unit rotors 300A.

Referring to FIGS. 2 and 3, a first unit rotor 300Aa, a second unit rotor 300Ab, and a third unit rotor 300Ac to an Nth unit rotor may be disposed downward from an upper portion thereof in the shaft direction. Accordingly, a first rotor core 310a, a second rotor core 310b, and a third rotor core 310c to an Nth rotor core are disposed downward to be stacked from the upper portion. In addition, the guide protrusions 312 are formed to protrude from the outer circumferential surface of each of the rotor cores 310, and thus the guide protrusions 312 of the first rotor core 310a, the guide protrusions 312 of the second rotor core 310b, and the guide protrusions 312 of the third rotor core 310c to the guide protrusions 312 of the Nth rotor core may be respectively referred to as first guide protrusions 312a, second guide protrusions 312b, and third guide protrusions 312c to Nth guide protrusions.

In this case, the rotor 300 may include N rotor cores 310, and the number of the holes 311 formed in each of the N rotor cores 310 may be at least 2N. That is, the number of the holes 311 formed in each of the rotor cores 310 may be two times the number of the rotor cores 310.

Since the motor 1, which is illustrated in FIGS. 2 and 3, includes the rotor 300 having three unit rotors 300A, the rotor 300 of the motor 1 will be described with respect to FIGS. 2 and 3. Accordingly, the motor 1 may include three rotor cores 310. In addition, six holes 311 may be formed in each of the three rotor cores 310.

In addition, the 2N holes 311 may include a first group A having N holes 311 for arranging the rotor cores 310 and a second group B having N holes 311 for balancing rotation of the rotor core 310. For example, when only the first group A having the N holes 311 is provided at one side of the rotor core 310 in the circumferential direction, a rotation balance problem occurs. Accordingly, as the second group B having the N holes 311 is formed to be symmetrical with the first group A, the rotation of the rotor 300 may be balanced.

Accordingly, six holes 311 of the motor 1 may be grouped into two groups each having three holes 311.

Referring to FIGS. 7 to 10, the rotor core 310 may include the first group A including the three holes 311 and the second group B including the three holes 311.

In this case, the plurality of holes 311 forming each of the groups may form first angles θ1 around the center of the rotor core 310. For example, two holes 311, which are adjacent to each other in the circumferential direction, of the N holes 311 of the first group A may form the first angle θ1. In addition, two other holes 311, which are adjacent to each other in the circumferential direction, may also form the first angle θ1.

That is, the first angles θ1 formed between the N holes 311 of the first group A may be the same. In this case, since the holes 311 of the second group B are symmetrically disposed with the holes 311 of the first group A, first angles θ1 formed between the N holes 311 of the second group B may be the same.

In addition, in the circumferential direction, a first hole 311 of the first group A and the hole 311, which is closest to the first hole 311, of the second group B may be disposed to form a second angle θ2. In this case, the second angle θ2 may be different from the first angle θ1. In this case, the first hole 311 of the first group A may be one of the holes 311 disposed at both ends of the first group A in the circumferential direction.

Referring to FIG. 10, the three holes 311 of the first group A may be referred to as a first hole 311a, a second hole 311b, and a third hole 311c sequentially in a clockwise direction. In addition, the three holes 311 of the second group B may also be referred to as a first hole 311a, a second hole 311b, and a third hole 311c sequentially in the clockwise direction.

As illustrated in FIG. 10, the first hole 311a of the first group A and the third hole 311c of the second group B may form the second angle θ2 around the center C. In addition, the second angle θ2 is different from the first angle θ1.

In this case, the first hole 311a which is the first hole 311 of the first group A may be provided as a reference hole for arranging the rotor cores 310. Accordingly, in a state in which the pin 330 is coupled to the first hole 311a of the first rotor core 310a, the pin 330 may be sequentially coupled to the second hole 311b of the second rotor core 310b and the third hole 311c of the third rotor core 310c.

In this case, the holes 311 are divided and described as the first hole 311a, the second hole 311b, and the third hole 311c but are not necessarily limited thereto. For example, the holes 311 may be referred to as a first hole 311a, a second hole 311b, and a third hole 311c sequentially in the counterclockwise direction.

In addition, the holes 311 of the first group A and the holes 311 of the second group B may be symmetrically disposed based on the center C of the rotor core 310.

For example, the holes 311 of the first group A and the holes 311 of the second group B may be disposed to be rotationally symmetrical based on the center C. In addition, when viewed from above, the holes 311 of the first group A and the holes 311 of the second group B may be symmetrically disposed based on a virtual line L passing through, in the radial direction, a center between the first hole 311a which is the first hole 311 of the first group A and the third hole 311c of the second group B in the circumferential direction. In this case, the center C of the rotor core 310 may be disposed on the line L.

In addition, the N rotor cores 310 may include the first rotor core 310a and the second rotor core 310b, each of which includes the plurality of guide protrusions 312. In addition, the first angle θ1 may be greater than a third angle θ3 formed by two guide protrusions 312, which are disposed adjacent to each other, of the plurality of guide protrusions 312 formed on the first rotor core 310a. In this case, the plurality of guide protrusions 312 of the second rotor core 310b may also form the third angle θ3. In addition, the plurality of guide protrusions 312 of the third rotor core 310c may also form the third angle θ3.

Figure 11:
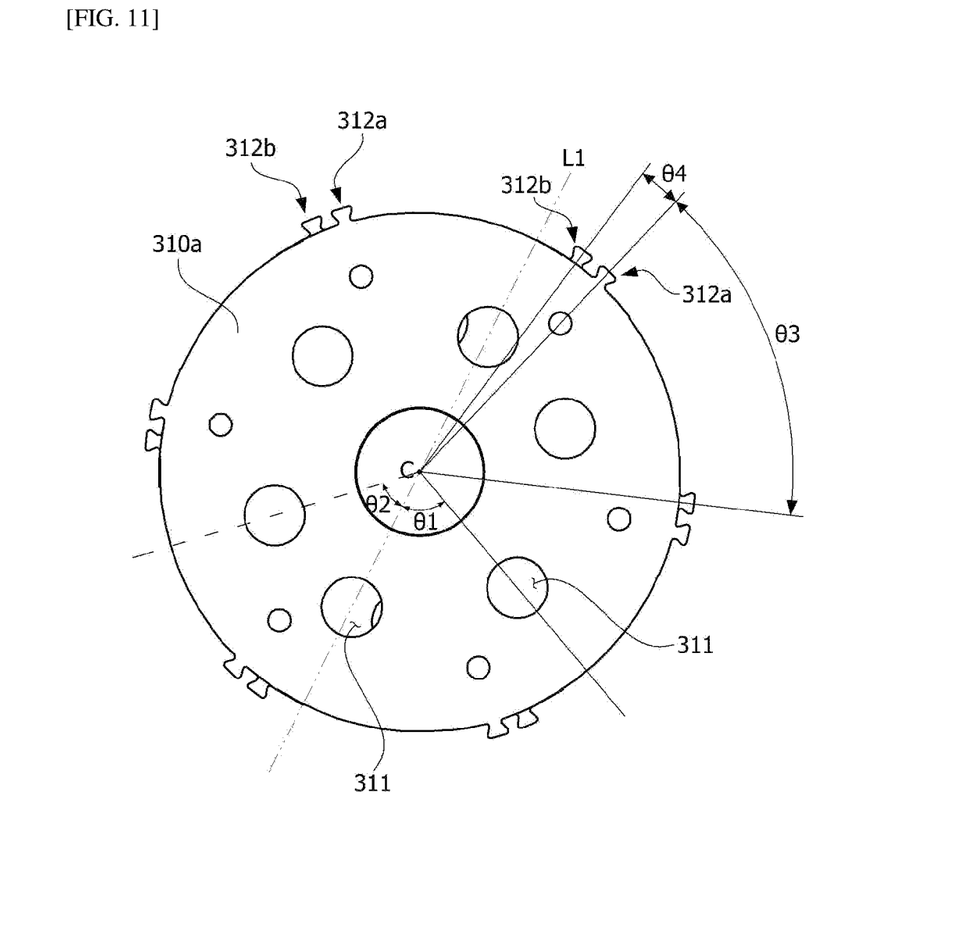
FIG. 11 is a plan view illustrating an arrangement relationship between a first rotor core and a second rotor core of the rotor disposed in the motor according to the embodiment.

FIG. 11 is a plan view illustrating an arrangement relationship between the first rotor core and the second rotor core of the rotor disposed in the motor according to the embodiment.

Referring to FIG. 11, the first guide protrusion 312a of the first rotor core 310a and the second guide protrusion 312b of the second rotor core 310b may form a predetermined angle θ4 around the center C. In this case, the angle θ4 may be referred to as a fourth angle.

In addition, the first angle θ1 may be the same as the sum of the third angle θ3 and the angle θ4.

That is, around a center C of the first rotor core 310a, two holes 311, which are adjacent to each other, of the plurality of holes 311 of the first rotor core 310a may form the first angle θ1 which is the same as the sum of the angle θ3 formed by two guide protrusions 312, which are adjacent to each other, of the guide protrusions 312 of the first rotor core 310a and the angle θ4 formed by the guide protrusion 312 of the first rotor core 310a and the guide protrusion 312, which is closest to the guide protrusion 312 of the first rotor core 310a in the circumferential direction, of the second rotor core 310b. In this case, two holes 311, which are adjacent to each other, of the plurality of holes 311 of the first rotor core 310a are the holes 311 included in the first group A or the second group B.

Accordingly, the first guide protrusion 312a of the first rotor core 310a may be disposed to overlap the magnet 320 attached to the second rotor core 310b in the shaft direction.

Meanwhile, the rotor 300 may include the first rotor core 310a, the second rotor core 310b, and the third rotor core 310c, each of which includes M holes 311 disposed to be spaced apart from each other. In this case, the M holes 311 may include a first hole 311a which is a reference hole, a second hole 311b disposed adjacent to the first hole 311a in the circumferential direction, and a third hole 311c disposed adjacent to the second hole 311b in the circumferential direction. In addition, the first hole 311a of the first rotor core 310a may be disposed to overlap the second hole 311b of the second rotor core 310b and the third hole 311c of the third rotor core 310c in the vertical direction. In this case, in the rotor 300, since the rotor 300 includes the holes 311 which overlap in two regions, the plurality of rotor cores 310 disposed in the shaft direction may be prevented from being distorted in the circumferential direction using two pins 330.

Referring to FIG. 5, the pin 330 may be disposed to pass through the first hole 311a of the first rotor core 310a, the second hole 311b of the second rotor core 310b, and the third hole 311c of the third rotor core 310c which are disposed to overlap in the vertical direction.

In this case, since each of the first hole 311a of the first rotor core 310a, the second hole 311b of the second rotor core 310b, and the third hole 311c of the third rotor core 310c is formed in pairs, holes 311 overlap in the two regions. Accordingly, the two pins 330 may be provided.

Since a possibility of movement or distortion in the circumferential direction is present when one pin 330 is disposed, the two pins 330 are used to prevent the plurality of rotor cores 310, which are disposed in the shaft direction, from being distorted in the circumferential direction in the rotor 300.

In addition, the rotor 300 may include the plurality of rotor cores 310 and the plurality of magnets 320 disposed on the outer circumferential surface of each of the rotor cores 310, and each of the rotor cores 310 may include the first holes 311a, the second holes 311b, and the third holes 311c. In this case, two first holes 311a, two second holes 311b, and two third holes 311c may be disposed mutually opposite to each other based on a center C of the shaft 500.

In addition, around the center C, an angle formed by one first hole 311a and the second hole may be the first angle θ1 which is the same as an angle formed by the second hole and the third hole.

In addition, the plurality of rotor cores 310 may include the first rotor core 310a, the third rotor core 310c, and the second rotor core 310b disposed between the first rotor core 310a and the third rotor core 310c. In this case, the first hole 311a of the first rotor core 310a, the second hole 311b of the second rotor core 310b, and the third hole 311c of the third rotor core 310c may overlap in the shaft direction.

In this case, when the number of the magnets 320 is six, the second angle θ2 formed by the one first hole 311a and the third hole 311c disposed adjacent to the first hole 311a around the center C may be smaller than the first angle θ1.

In this case, the first angle θ1 may be 66.67°.

In addition, the sum of the angle formed by the first hole 311a and the second hole 311b, the angle formed by the second hole 311b and the third hole 311c around the center C, and the second angle θ2 is 180°.

Referring to FIG. 10, when viewed from above, the first hole 311a and the second hole 311b may be symmetrically disposed based on a virtual line L1 connecting centers of the pair of the third holes 311c and the center C of the rotor core 310.

In addition, when the number of the magnets 320 is eight, the second angle θ2 formed by one first hole 311a and the third hole 311c disposed adjacent to the one first hole 311a around the center C may be greater than the first angle θ1.

In this case, the first angle θ1 may be 50°.

In addition, the sum of the angle formed by the first hole 311a and the second hole 311b, the angle formed by the second hole 311b and the third hole 311c around the center C, and the second angle θ2 is 180°.

Referring to FIG. 10, when viewed from above, the first hole 311a and the second hole 311b may be symmetrically disposed based on the virtual line L1 connecting the centers of the pair of the third holes 311c and the center C of the rotor core 310.

Meanwhile, the rotor 300 may further include a can (not shown) disposed to cover the rotor core 310 to which the magnets 320 are attached.

The can may protect the rotor core and the magnets from external shocks and physical and chemical stimuli while preventing foreign materials from being introduced to the rotor core and magnets.

In addition, the can prevents the magnets 320 from being separated from the rotor core 310.

The stator 400 may be disposed inside the housing 100. In this case, the stator 400 may be supported by an inner circumferential surface of the housing 100. In addition, the stator 400 is disposed outside the rotor 300. That is, the rotor 300 may be disposed inside the stator 400.

Referring to FIG. 1, the stator 400 may include a stator core 410, insulators 420 disposed on the stator core 410, and coils 430 wound around the insulators 420.

The coils 430 configured to generate a rotating magnetic field may be wound around the stator core 410. In this case, the stator core 410 may be formed as one core or a plurality of divided cores that are coupled.

The stator core 410 may be formed in a form in which a plurality of thin steel sheets are stacked on each other but is not necessarily limited thereto. For example, the stator core 410 may be formed as one single product.

The stator core 410 may include a yoke (not shown) having a cylindrical shape and a plurality of teeth (not shown) protruding from the yoke in the radial direction. In addition, the coil 430 may be wound around the tooth.

The insulator 420 insulates the stator core 410 from the coil 430. Accordingly, the insulator 420 may be disposed between the stator core 410 and the coil 430.

Accordingly, the coil 430 may be wound around the stator core 410 on which the insulator 420 is disposed.

The shaft 500 may be disposed in the housing 100 to be rotatable by the bearings 10. In addition, the shaft 500 may rotate in conjunction with rotation of the rotor 300.

Referring to FIG. 3, the shaft 500 may include a shaft body 510 formed in a cylindrical shape and a plurality of protrusions 520 disposed on an outer circumferential surface of the shaft body 510 to be spaced apart from each other in the circumferential direction.

The shaft 500 may be coupled to the hole formed at the center of the rotor core 310 through a press-fitting method. In this case, due to the protrusions 520, the shaft 500 may be easily press-fitted to the rotor core 310.

The busbar 600 may be disposed above the stator 400.

In addition, the busbar 600 may be electrically connected to the coils 430 of the stator 400.

The busbar 600 may include a busbar body (not shown) and a plurality of terminals (not shown) disposed in the busbar body. In this case, the busbar body may be a mold product formed through an injection molding process. In addition, each of the terminals may be electrically connected to the coil 430 of the stator 400.

The sensor part 700 may detect a magnetic force of a sensing magnet installed to rotate in conjunction with the rotor 300 to check a present position of the rotor 300 so as to detect rotation of the shaft 500.

The sensor part 700 may include a sensing magnet assembly 710 and a printed circuit board (PCB) 720.

The sensing magnet assembly 710 is coupled to the shaft 500 to operate in conjunction with the rotor 300 so as to detect the position of the rotor 300. In this case, the sensing magnet assembly 710 may include sensing magnets and a sensing plate.

The sensing magnets may include main magnets disposed close to a hole forming an inner circumferential surface thereof in the circumferential direction and sub-magnets formed at an edge thereof. The main magnets may be arranged like the drive magnets inserted into the rotor 300 of the motor. The sub-magnets may be divided further than the main magnets so that the sub-magnets may be formed to have poles of which the number is greater than the number of poles of the main magnets. Accordingly, a rotation angle may be divided and measured more precisely, and thus the motor may be driven more smoothly.

The sensing plate may be formed of a metal material having a disc shape. The sensing magnet may be coupled to an upper surface of the sensing plate. In addition, the sensing plate may be coupled to the shaft 500. In this case, a hole through which the shaft 500 passes is formed in the sensing plate.

A sensor configured to detect a magnetic force of the sensing magnets may be disposed on the PCB 720. In this case, a Hall integrated circuit (IC) may be provided as the sensor. In addition, the sensor may detect changes in an N-pole and an S-pole of the sensing magnet to generate a sensing signal.

Meanwhile, in the motor 1, the protrusions 520 of the shaft 500 may be used to determine a direction of a press-fitting force applied to the rotor core 310 in the radial direction. In addition, in the motor 1, holes and grooves may be formed in the rotor core 310 to be positioned on radii which are the same as radii on which the protrusions 520 are formed so as to reduce a stress which is applied to the magnets 320 due to the press-fitting force.

While the present invention has been described with reference to the exemplary embodiments thereof, it will be understood by those skilled in the art that various changes in form and details may be made therein without departing from the spirit and scope of the invention as defined by the appended claims.

[Reference Numerals]

| | |
|---|---|
| 1: MOTOR | 100: HOUSING |
| 200: COVER | 300: ROTOR |
| 300A: UNIT ROTOR | 310: ROTOR CORE |
| 310A: FIRST ROTOR CORE | 310B: SECOND ROTOR CORE |
| 310C: THIRD ROTOR CORE | 311: HOLE |
| 311A: FIRST HOLE | 311B: SECOND HOLE |
| 311C: THIRD HOLE | 312: GUIDE PROTRUSION |
| 320: MAGNET | 330: PIN |

-continued

[Reference Numerals]

| | |
|---|---|
| 400: STATOR | 410: STATOR CORE |
| 430: COIL | 500: SHAFT |
| 600: BUSBAR | 700: SENSOR PART |

The invention claimed is:

1. A motor comprising:
a shaft;
a rotor coupled to the shaft; and
a stator disposed outside the rotor,
wherein
the rotor includes a number (N) of rotor cores, and a plurality of magnets disposed on an outer circumferential surface of each of the rotor cores,
at least 2N holes are formed in one of the N rotor cores,
the at least 2N holes include a first group of at least N holes to arrange the rotor cores and a second group of least N holes to balance rotation of the rotor cores, and
first angles ($\theta1$) formed between adjacent pairs of the at least N holes of the first group are the same.

2. The motor of claim 1, wherein a second angle ($\theta2$) formed by a first hole of the first group and one of the holes of the second group which is closest to the first hole is different from the first angle ($\theta1$) of the first group.

3. The motor of claim 2, wherein the first hole of the first group is a reference hole for arranging the rotor cores.

4. The motor of claim 1, wherein the holes of the first group and the holes of the second group are symmetrical based on a center of the rotor core.

5. The motor of claim 1, wherein:
each of the N rotor cores includes a plurality of guide protrusions formed on an outer circumferential surface of the rotor core; and
the guide protrusions of the N rotor cores do not overlap in a vertical direction.

6. The motor of claim 1, wherein:
each of the N rotor cores includes a first rotor core and a second rotor core, each of which includes a plurality of guide protrusions; and
the first angle is greater than a third angle ($\theta3$) formed by two guide protrusions, which are disposed adjacent to each other, of the plurality of guide protrusions formed on the first rotor core.

7. The motor of claim 6, wherein the first angle ($\theta1$) is a sum of the third angle ($\theta3$) and an angle ($\theta4$) formed by one of the guide protrusions of the first rotor core and the guide protrusion, which is closest to the one of the guide protrusions, of the second rotor core.

8. A motor comprising:
a shaft;
a rotor coupled to the shaft; and
a stator disposed outside the rotor,
wherein
the rotor includes a first rotor core, a second rotor core, and a third rotor core, each of which includes M holes that are spaced apart from each other,
the M holes include a first hole which is a reference hole, a second hole adjacent to the first hole, and a third hole adjacent to the second hole,
the first hole of the first rotor core is disposed to overlap the second hole of the second rotor core and the third hole of the third rotor core in a vertical direction, and
the rotor further includes a pin positioned to pass through the first hole of the first rotor core, the second hole of the second rotor core, and the third hole of the third rotor core.

9. The motor of claim 8, wherein
each of the first rotor core and the second rotor core includes a plurality of guide protrusions, and
two holes, which are adjacent to each other, of the holes of the first rotor core form a first angle (θ1) which is the same as a sum of an angle (θ3) formed by two guide protrusions, which are adjacent to each other, of the guide protrusions of the first rotor core and an angle (θ4) formed by the guide protrusion of the first rotor core and the guide protrusion, which is closest to the guide protrusion of the first rotor core in a circumferential direction, of the second rotor core around a center of the first rotor core.

10. The motor of claim 8, wherein:
the M holes include a pair of the first holes, a pair of the second holes, and a pair of the third holes,
the pair of first holes of the first rotor core are disposed to overlap the pair of second holes of the second rotor core and the pair of third holes of the third rotor core in a vertical direction, and
the rotor further includes a pair of the pins positioned to pass through, respectively, the pair of first holes of the first rotor core, the pair of second holes of the second rotor core, and the pair of third holes of the third rotor core.

11. A motor comprising:
a shaft;
a rotor coupled to the shaft; and
a stator disposed outside the rotor,
wherein
the rotor includes a plurality of rotor cores and a plurality of magnets disposed on an outer circumferential surface of each of the rotor cores,
each of the rotor cores includes first holes, second holes, and third holes,
two of the first holes, two of the second holes, and two of the third holes are disposed mutually opposite to each other based on a center (C) of the shaft,
a first angle (θ1) formed by one of the first holes and the second hole is the same as an angle formed by the second hole and the third hole around the center (C),
the plurality of rotor cores include a first rotor core, a third rotor core, and a second rotor core disposed between the first rotor core and the third rotor core, and
the first hole of the first rotor core, the second hole of the second rotor core, and the third hole of the third rotor core overlap in a shaft direction.

12. The motor of claim 11, wherein, when the number of the magnets is six, a second angle (θ2) formed by the one of the first holes and the third hole which is disposed adjacent to the one of the first holes around the center (C) is smaller than the first angle (θ1).

13. The motor of claim 12, wherein the first angle (θ1) is 66.67°.

14. The motor of claim 11, wherein, when the number of the magnets is eight, a second angle (θ2) formed by the one of the first holes and the third hole which is disposed adjacent to the one of the first holes around the center (C) is greater than the first angle (θ1).

15. The motor of claim 14, wherein the first angle θ1 is 50°.

16. The motor of claim 11, wherein a sum of an angle formed by the first hole and the second hole, an angle formed by the second hole and the third hole, and the second angle θ2 is 180°.

17. The motor of claim 11, wherein the first hole and the second hole are symmetrical based on a virtual line (L1) connecting a center of the third hole and a center (C) of the rotor core.

18. The motor of claim 11, wherein the rotor further includes a pin disposed to pass through the first hole of the first rotor core, the second hole of the second rotor core, and the third hole of the third rotor core which are disposed to overlap in a vertical direction.

19. The motor of claim 18, wherein the rotor includes two of the pins.

* * * * *